US012790249B2

(12) United States Patent
Xu et al.

(10) Patent No.: US 12,790,249 B2
(45) Date of Patent: Nov. 10, 2026

(54) METHOD AND APPARATUS FOR THE REVALORIZATION OF VARIOUS ORGANIC RESIDUES

(71) Applicant: SERVICE ENVIRO SCAD INC., Namur (CA)

(72) Inventors: Songwen Xu, Namur (CA); Denis Daoust, Namur (CA); Ying Tan, Ville de Ningbo (CN); Ran Tao, Montreal (CA); Angela Angie Tao, Montreal (CA)

(73) Assignee: SERVICE ENVIRO SCAD INC., Namur (CA)

( * ) Notice: Subject to any disclaimer, the term of this patent is extended or adjusted under 35 U.S.C. 154(b) by 768 days.

(21) Appl. No.: 18/124,088

(22) Filed: Mar. 21, 2023

(65) Prior Publication Data

US 2023/0295028 A1 Sep. 21, 2023

(30) Foreign Application Priority Data

Mar. 21, 2022 (CA) ................................ CA 3152843
Feb. 21, 2023 (CN) ......................... 202310139465.4

(51) Int. Cl.
*B09B 3/60* (2022.01)
*C02F 11/02* (2006.01)
(Continued)

(52) U.S. Cl.
CPC ................ *C02F 11/02* (2013.01); *B09B 3/60* (2022.01); *B09B 2101/70* (2022.01);
(Continued)

(58) Field of Classification Search
CPC .. C02F 11/02; C02F 2103/20; C02F 2103/28; C02F 2201/005; C02F 2203/006;
(Continued)

(56) References Cited

U.S. PATENT DOCUMENTS

2012/0048801 A1* 3/2012 Hong .................... C02F 3/2853 210/603

FOREIGN PATENT DOCUMENTS

CA 2607730 11/2016
CN 113862134 A * 12/2021 ............ C12M 41/40
(Continued)

OTHER PUBLICATIONS

Europe Search Report dated Dec. 14, 2023, for Europe Application No. 23163252, 8 pages.
(Continued)

*Primary Examiner* — Liban M Hassan

(57) ABSTRACT

The present invention makes public a method and an apparatus for the revalorization of various organic waste, by means of physics and mechanics. The bubbles are produced and injected into the mixture in the sealed tank under depressure, then establish the movement of toric rotation in the vertical direction. The high-speed movement bubble carrying focused energy vigorously collide into the mixture, thus showing the Rheo-fluidizing effect (Shear thinning), decreasing the viscosity and depolymerizing long-chain molecules. This achieves active bacteria killing, separation, concentration and de-emulsification; the solution's advantage is applied to various organic residue, with short and efficient processing cycles, without producing unpleasant odors and is non-polluting, chemical free, at low temperature, low energy consumption, no GHG emission, preserving the microorganisms and nutrients of organic matter, and separating the pollutants such as the oils and fats. The usage of the output is unlimited, the invention is helpful to restore the ecosystem.

10 Claims, 6 Drawing Sheets

Figure 2:
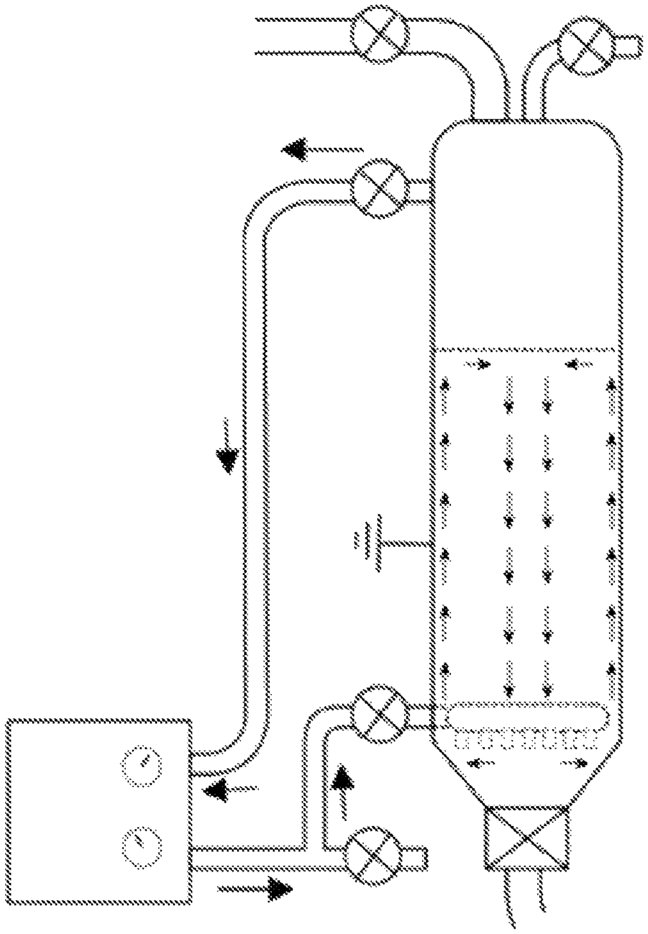

(51) Int. Cl.
*B09B 101/70* (2022.01)
*B09B 101/85* (2022.01)
*C02F 103/20* (2006.01)
*C02F 103/28* (2006.01)

(52) U.S. Cl.
CPC ....... *B09B 2101/85* (2022.01); *C02F 2103/20* (2013.01); *C02F 2103/28* (2013.01); *C02F 2201/005* (2013.01); *C02F 2203/006* (2013.01)

(58) Field of Classification Search
CPC .. C02F 2101/325; C02F 1/40; C02F 2209/02; C02F 2301/026; C02F 1/34; C02F 2301/063; C02F 2303/04; B09B 3/60; B09B 2101/70; B09B 2101/85; C05F 3/00; C05F 9/00; Y02P 20/145; Y02E 50/30
See application file for complete search history.

(56) References Cited

FOREIGN PATENT DOCUMENTS

| | | | | | | |
|---|---|---|---|---|---|---|
| JP | 2001038335 | A | | 2/2001 | | |
| KR | 20110118233 | A | * | 10/2011 | .............. | C02F 11/02 |
| KR | 20170033614 | | | 3/2017 | | |
| WO | 0168563 | A1 | | 9/2001 | | |
| WO | WO-2018073845 | A1 | * | 4/2018 | ................ | C10J 3/66 |
| WO | WO-2023163580 | A1 | * | 8/2023 | .............. | C12M 1/08 |

OTHER PUBLICATIONS

Food wastage footprint Impacts on natural resources, Summary Report, 2013.
Machine English Translation of KR20170033614.

* cited by examiner

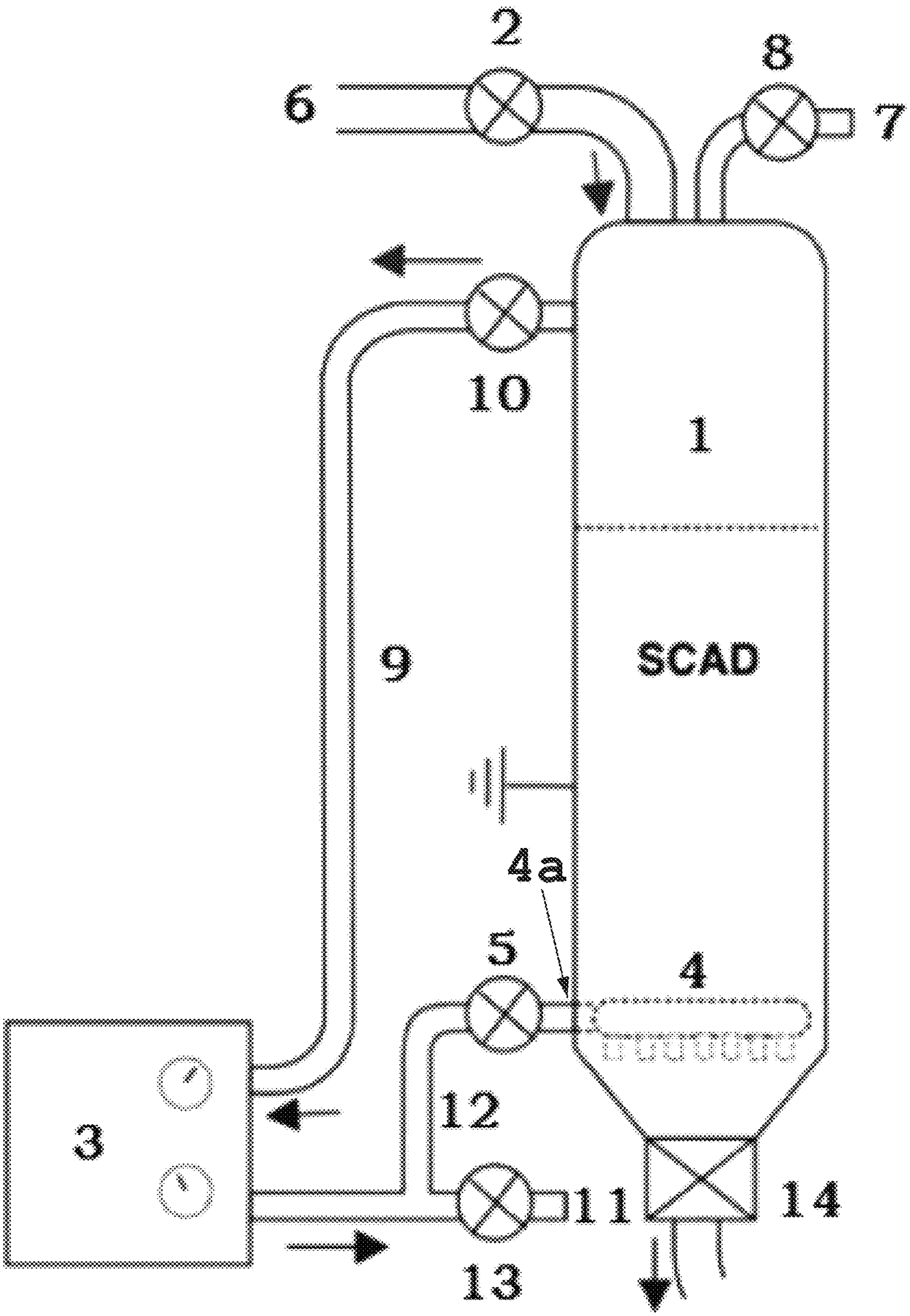
Figure 1（a）

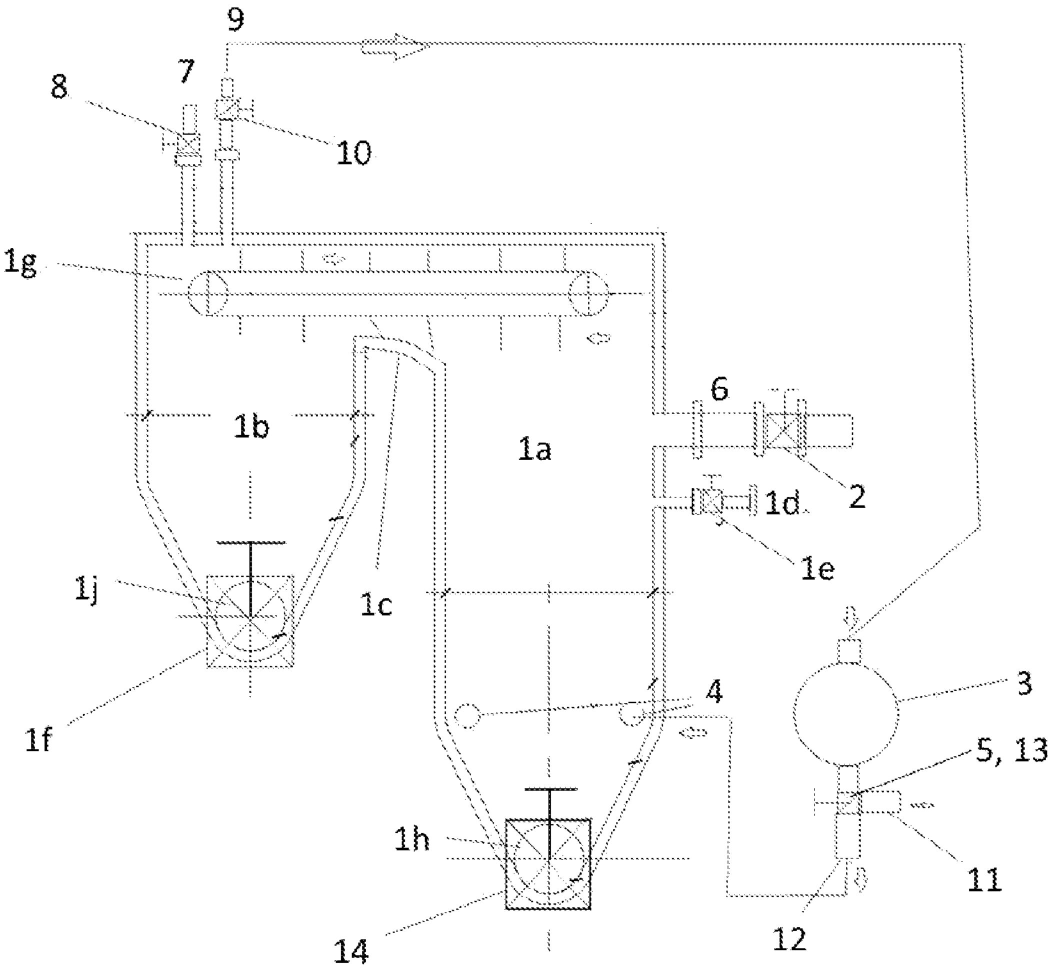
Figure 1（b）

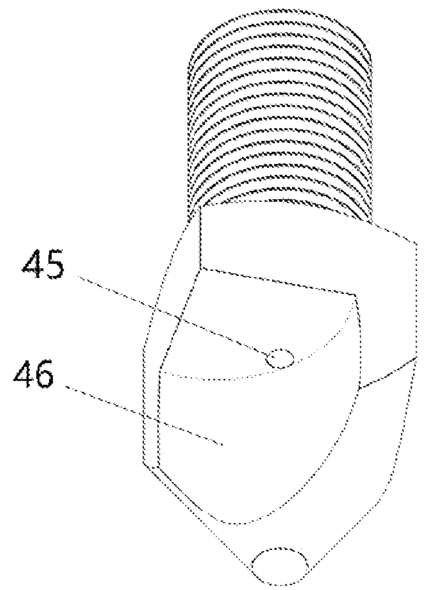
Figure 4（a）
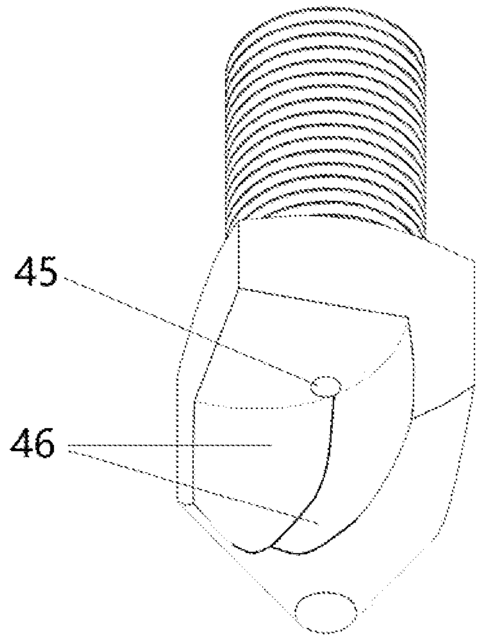
Figure 4（b）

METHOD AND APPARATUS FOR THE REVALORIZATION OF VARIOUS ORGANIC RESIDUES

TECHNOLOGY OF INVENTION

This invention describes a technology targeting the revalorization of organic residues. In particular, it touches upon the apparatus and method involved in the process.

BACKGROUND OF TECHNOLOGY

Large quantities of organic waste and residues pose significant processing challenges for our modern society. In 2016, in its report "Food wastage footprint impacts on natural resources, the Unite Nations' Food and Agriculture Organization (FAO) estimated that one third of the food produces on the planet is lost or thrown away instead of being consumed, hence creating large amounts of organic residues.

Traditionally, landfill and incineration are ways to manage organic waste. In reason of the impact on the environment caused by the release of methane from landfilling, the necessity of these methods is being increasingly questioned. As for incineration, this way of processing releases toxic substances into the atmosphere.

An increasing number of cities in the world are establishing organic waste management systems in order to compost or produce biogas. Although the cost of compost technology is relatively low, it takes several weeks to several months to transform organic residues. With a long cycle, and along with the fact that is mainly stored outside, there are numerous disadvantages such as weather conditions, bad odour attractive to vermin, and pollution to the environment. As for bioreactors to produce the biogas, requires highly expensive bioreactors. Although the timeframe for this process is shorter, in order to amortize the investments, there is need for abundant constant supply of organic residues. However, throughout the yearly cycle, the supply of organic waste is commonly unstable, resulting in the high cost of bioreactor investment.

In recent years, some researchers proposed to manage a subtype of organic residue, namely food waste, either at home or in the workplace, greatly reducing the volume and weight of the waste as well as its unpleasant odor. Numerous patents describe such devices or systems such as Canadian patent "Food waste treatment apparatus using microwave", number CA 2607730, issued in 2011, and Keroa patent "Grinding food waste and drying apparatus", and the numbered KR201170033614A, issued in 2017.

The technology featured in those patents are based off shredding the food waste and drying at high temperature. While greatly reducing the weight and volume of food waste, compared to biogas production, the investment cost is relatively low. And compared to compost, this process avoids unpleasant odour and does not pollute the environment. However, the technology developed in these patents require high temperature drying, which destroy the vast majority of microorganisms and nutrients found in food waste. In addition, it is incapable of removing the greases and salt from the waste, which limits the use of the final product.

SUMMARY OF INVENTION

The present invention aims to solve one of the technical problems is to provide a method, which is a short processing cycle, an efficient way of revalorizing organic waste without producing unpleasant odors and non-polluting. Further properties are its low temperature, low energy consumption, relatively low investment cost, all while without destroying the microorganisms and nutrients in the organic waste and separating the pollutants such as the oils and fats, so that the organic matter is obtaining the cleaning and separation, this will not limit the use of the final product, pushing the cycle of organic matter towards an ecological path.

The technical solution adopted by the present invention to solve one the above-mentioned technical problems is a method for revalorization of various organic residue. First, enter the fluid mixture of organic matter and water (hereafter referred to as "mixture") in a hermetically sealed tank has negative pressure while maintaining low temperature. The bubbler produces gas bubbles that inject to the mixture and vigorously stir the mixture in the sealed tank under depressure, then establish the movement of toric rotation in the vertical direction in the mixture. If there is a requirement to kill the active bacteria, the sealed tank will maintain a temperature between 20 and 30 degrees Celsius. Otherwise, the low temperature remains between 10 and 40 degrees Celsius.

Compared to current technology, the present invention has the advantage of producing the gas bubbles by means of bubblers, the bubbles are injected to the mixture and vigorously stir the mixture in the sealed treatment tank under depressure, then establish the movement of toric rotation in the vertical direction in the mixture, which is, the mixture rise along the inner wall of the hermetically sealed treatment tank, and flow down in the center part of sealed treatment tank, re-rise again along the inner wall of the treatment tank, the cycle is build up and continued. During the movement of toric rotation in the vertical direction of the mixture, the high-speed movement bubble with energy focusing effect, which is a state of high energy density, it vigorously collides into the mixture, thus showing the Rheo-fluidizing effect (Shear thinning), decrease the viscosity of the mixture, and depolymerize long-chain molecules in organic waste.

If grease emulsion is present in the mixture, de-emulsifying occurs, separating oils and fats. This happens while, because of depressure, if present, active bacteria are killed, spores and inactive bacteria remain in the small quantity of grease mixed in the organic matter. Finally, organic matter is separated into water soluble substances, higher-density than water insoluble substances and lower-density than water insoluble substances. The soluble substances will dissolve into the water, the higher-density insoluble substances will decant to the bottom of the container, and the lower-density insoluble substances will float on top of the water level. This achieves active bacteria killing, separation, concentration and de-emulsification. This invention uses an efficient solution to revalorizing organic matter, which has short processing cycle, an efficient way of revalorizing organic waste without producing unpleasant odors and non-polluting. Further properties are its low temperature, low energy consumption, relatively low investment cost, all while without destroying the microorganisms and nutrients in the organic waste and separating the pollutants such as the oils and fats, so that the organic matter is obtaining the cleaning and separation, this will not limit the use of the final product, pushing the cycle of organic matter towards an ecological path.

The present invention aims to solve second of the technical problems is to provide an apparatus, which is a short processing cycle, efficient way of revalorizing organic waste without producing unpleasant odors and non-polluting. Further properties are its low temperature, low energy consumption, relatively low investment cost, all while without destroying the microorganisms and nutrients in the organic waste and separating the pollutants such as the oils and fats, so that the organic matter is obtaining the cleaning and separation, this will not limit the use of the final product, pushing the cycle of organic matter towards an ecological path.

The technical solution adopted by the present invention to solve the second above-mentioned technical problems is an apparatus for the revalorization of various organic residue. It includes a treatment tank, an inlet valve du mélange, a vacuum pump to achieve negative pressure in the treatment tank, a bubbler and an inlet valve. The treatment tank contains a feed inlet and a vent valve connected to the inside of it. The described inlet is connected to the inlet valve, which is installed on the entry pipe, in order to control its opening and closing. The described entry pipe conducts the entrance of the mixture of fluid organic residue with water into the treatment tank, the described mixture is obtained by means of mixing evenly the organic waste and water. The described vent valve is connected to a vent pipe, on which is installed the first vent valve. The described first vent valve controls the opening and closing of the vent pipe. A suction pipe installed on the upper part of the treatment tank connects to the interior of the treatment tank.

The mixture entering the treatment tank situates lower than the position of the suction valve. The vacuum pump has an inlet and an exhaust outlet. The former is called the first inlet. This first inlet connects to the suction through the suction pipe. The suction pipe has installed on it an inlet valve, which controls the opening and closing of the suction pipe, causing the first inlet and the suction valve to be either connected or disconnected.

The exhaust outlet of the described vacuum pump is connected to two outlet pipes, the two outlet pipes are called the first exhaust outlet pipe and second outlet pipe to the bubbler respectively, the second vent valve is installed on the first exhaust outlet pipe, The latter is used to open and close the first exhaust outlet pipe. The treatment tank's lower part has an inlet connected to the interior of the treatment tank. This inlet is called the second inlet. The described second outlet pipe to the bubbler is connected to the second inlet. The described inlet valve is installed on the described second outlet pipe to the bubbler, and it is used to open or close the described second outlet pipe to the bubbler, causing the second outlet pipe and the second inlet to be either connected or disconnected.

The treatment tank has installed on it the first discharge outlet which is connected to the interior of the treatment tank, the first discharge valve is installed on the first outlet, which controls the opening and closing of the first outlet. The bubbler is installed on the interior of the treatment tank, facing the second inlet. The described hermetically sealed treatment tank in which the pressure is negative while maintaining low temperature. The bubbler produces gas bubbles that inject to the mixture and vigorously stir the mixture in the sealed treatment tank under depressure, then establish the movement of toric rotation in the vertical direction in the mixture. If there is a requirement to kill the active bacteria, the sealed treatment tank will maintain a temperature between 20 and 30 degrees Celsius. Otherwise, the low temperature remains between 10 and 40 degrees Celsius.

The bubbler includes the adapted format first tube on the inner wall of the treatment tank, connecting tube and multiple second tubes. The first tube is fixed to the treatment tank. The connecting tube connects the inside of the first tube with the second inlet valve. Multiple second tubes are evenly distributed around a circle, at the bottom of the first tube. Multiple second tubes are set up vertically on the lower side wall of the first tube and are connected with the inside of the first tube. Every second tube has on its bottom part a nozzle connected to the inside of the tube. Bubbles are produced within the nozzle and are injected out through it.

The top part of the nozzle has a perforation. The latter together with the second tube, are used to produce bubbles. The bottom part of the nozzle has a curved groove, or two curved grooves positioned in parallel. When there is one curved groove the bubbles produced by the nozzle land on the groove and slide along the surface of the curved groove, while they get prolonged horizontally, the bubbles are stretched in an oblong shape, eventually leaving the curved groove to be moving towards the inner wall of the treatment tank. When there are two grooves, the two of them are interconnected, and they are symmetric bilaterally. Their connecting edge are located higher than the lowest point of the curved grooves. The bubbles are produced at nozzle, go through the perforation and land on the connecting part of the curved grooves and slide along the surface of the curved groove, forcing an ellipsoid shape on the bubbles as it happens. They end up leaving the grooves for the inner walls of the treatment tank. Each oblong-shaped bubble can be in contacted with the adjacent bubbles. Thus, the bubbles coming out of the nozzle into the inner wall of the treatment tank form a circle, mixing the mixture in a stronger circular motion. It facilitates the shear-thinning, depolymerization, de-emulsification and separation.

The diameter of the perforation is between 3/32 inches and 3/16 inches.

The angle θ1 between the vertical axis and direction of injection of the nozzle is between 23 and 30 degrees.

A linear accelerator is placed between the second outlet pipe and the second inlet. This described accelerator is implemented with a converging tube, with an angle of convergence of the tube between 69 and 70 degrees.

The vacuum inside the treatment tank is between 0.5 to 0.95 bar.

The diameter and height of the treatment tank have ratio between 1/5 to 3/5. When the treatment tank is not cylindrical, then the diameter is the equivalent diameter of the described treatment tank.

The mixture entering the described treatment tank takes up between 50% and 75% of the volume of the tank.

The described residue is fiber-rich organic waste, the described treatment tank contains a major tank and an auxiliary tank, the major and auxiliary tanks are set up in a parallel way. The upper part of major tank and of auxiliary tank are connected, the bottom of this connection is called lip overflow, the vent and described suction pipeline are installed on the auxiliary tank. The feed inlet of mixture and the second inlet are installed on the major tank. The first outlet is installed to the bottom of the major tank. The water inlet is fixed to the major tank, the described water inlet is connected to water inlet pipe. A water inlet valved is installed on the water described inlet pipe. The water inlet valve controls the opening and closing the described inlet pipe. The second outlet is installed to the bottom of the auxiliary tank and is connected to the interior of the auxiliary tank, the second outlet valve is installed to the second outlet pipe, the second outlet valve controls the opening and closing of the described second outlet.

The described bubbler is located inside of major tank. The mixture of the organic waste and water inside the major tank is separated in three parts: density lower than water insoluble substances which high-fiber organic matter based floating matter, the soluble substance, and the insoluble substance with density higher than water insoluble substances which is residue. The apparatus for the revalorization of various organic residue also contains the brush conveyor, an endless screw outlet for residue, an endless screw outlet for fiber-rich organic matter.

The described brush conveyor is horizontally installed above the described lip overflow and extend from the upper part of major tank to that of the auxiliary tank. The described brush conveyor is used to sweep the fiber-rich organic waste, whose liquid level reaches the lip overflow, from the major tank to auxiliary tank, the discharge of fiber-rich organic matter is installed on the bottom of auxiliary tank, facing the second outlet. It is used to output the fiber-rich organic matter in auxiliary tank while the second outlet valve opens. The endless screw outlet for described residue is installed on the bottom of the major tank, facing the first outlet. It is used to output the residue of the major tank when the first discharge outlet valve opens. The described water inlet is used to input the water to major tank, to raise the liquid level to lip overflow, and the fibre-rich organic matter can be swept into the interior of the auxiliary tank by brush conveyor.

Comparing the existing technology, the apparatus for the revalorization of various organic waste, presented by the present invention, is consisting by the treatment tank, inlet valve du mélange, a vacuum pump to achieve negative pressure in the treatment tank, bubbler and inlet valve, the inlet pipe is installed to input of the treatment tank which is connected to the inside of it, the inlet valve is installed on the inlet pipe, the described mixture is obtained by means of mixing evenly the organic waste and water, the described vent valved is connected to the vent pipe, on which is installed the described first vent valve, a suction pipe installed on the upper of the tank connects to its interior. The mixture entering the treatment tank situates lower than the position of the suction valve.

The vacuum pump is equipped with the first inlet and an exhaust outlet. This first inlet connects to the suction line through the suction pipe. The suction pipe has installed on it an inlet valve, the first exhaust outlet and second outlet to the bubbler are installed the outlet of vacuum pump. The second outlet valve is installed on the first exhaust outlet pipe. The second inlet is installed the lower part of the treatment tank which is connected to its interior. The second outlet to the bubbler is connected to the second inlet. The inlet valve is installed to the second outlet pipe. The first discharge outlet of organic matter is installed on the treatment tank and is connected to interior of the treatment tank. The first discharge valve is installed on the first discharge outlet. The bubbler is installed in the inside of the treatment tank, facing the second inlet.

During the operation of the apparatus, first open the feed input and the first vent valve. Then close the inlet valve, exhaust outlet valve, the second vent valve and the first discharge outlet valve. When the treatment tank is ambient pressure, enter the pre-prepared the fluid mixture of organic matter and water into the treatment tank, then close the feed input of mixture and the first vent valve; then open the inlet valve and the second vent valve, start the vacuum pump to partially evacuate the gas in the treatment tank above the mixture through the first exhaust outlet pipe, until the vacuum reaches the preset depressure and hold at this preset vacuum for typically 3 minutes to remove methane following the death of active bacteria. At this time, close the second vent valve, open the outlet valve, the evacuated gas enters the bubbler by the second outlet pipe. The bubbles with negative pressure are produced in the bubbler, then are injected into the mixture and vigorously stir the mixture in the sealed treatment tank under depressure, then establish the movement of toric rotation in the vertical direction in the mixture. The mixture rises along the inner wall of the hermetically sealed treatment tank and flow down in the center part of sealed treatment tank, re-rise again along the inner wall of the treatment tank and the movement forms a cycle.

During the movement of toric rotation in the vertical direction of the mixture, the high-speed movement bubble carrying focused energy vigorously collide into the mixture of organic waste and water, thus showing the Rheo-fluidizing effect (Shear thinning), decrease the viscosity of the mixture of organic waste, and depolymerize long-chain molecules in organic waste.

If grease emulsion is present in the mixture, at this time de-emulsifying occurs, separating oils and fats. This happens while, because of effect of depressure, if present, active bacteria are killed. Spores and inactive bacteria remain in the small quantity of grease mixed in the organic matter. This achieves active bacteria killing, separation, concentration and de-emulsification.

After 10 to 15 minutes of the movement of toric rotation in the vertical direction of the mixture of organic waste and water, the organic matter is separated into water soluble substances, higher-density than water insoluble substances and lower-density than water insoluble substances. The soluble substances will dissolve into the water, the higher-density insoluble substances will decant to the bottom of the container, and the lower-density insoluble substances will float on top of the water level. This achieves active bacteria killing, separation, concentration, de-emulsification. This invention uses an efficient solution to revalorize organic matter, which has short processing cycle, an efficient way of revalorizing organic waste without producing unpleasant odors and non-polluting. Further properties are its low temperature, low energy consumption, relatively low investment cost, all while without destroying the microorganisms and nutrients in the organic waste and separating the pollutants such as the oils and fats, so that the organic matter is obtaining the cleaning and separation, this will not limit the use of the final product, pushing the cycle of organic matter towards an ecological path.

BRIEF DESCRIPTION OF THE FIGURES FOR THE PRESENT INVENTION

Figure 3:
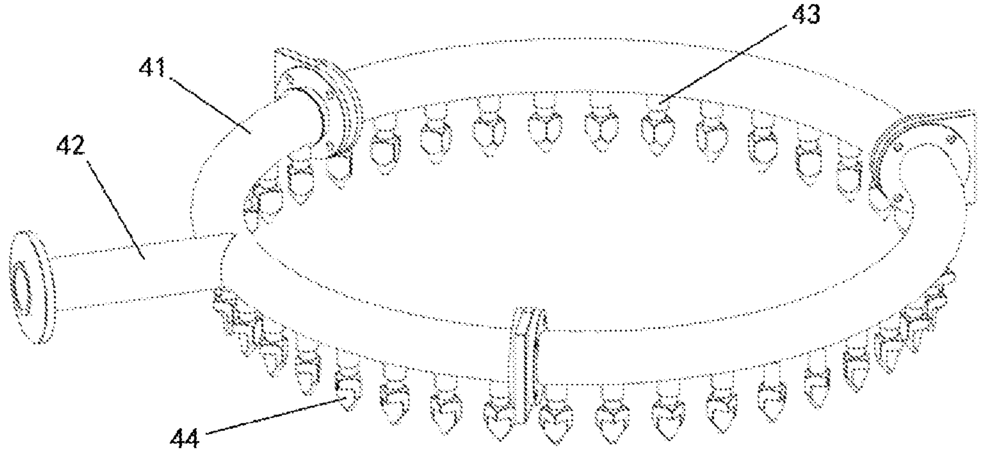
Figure 5:
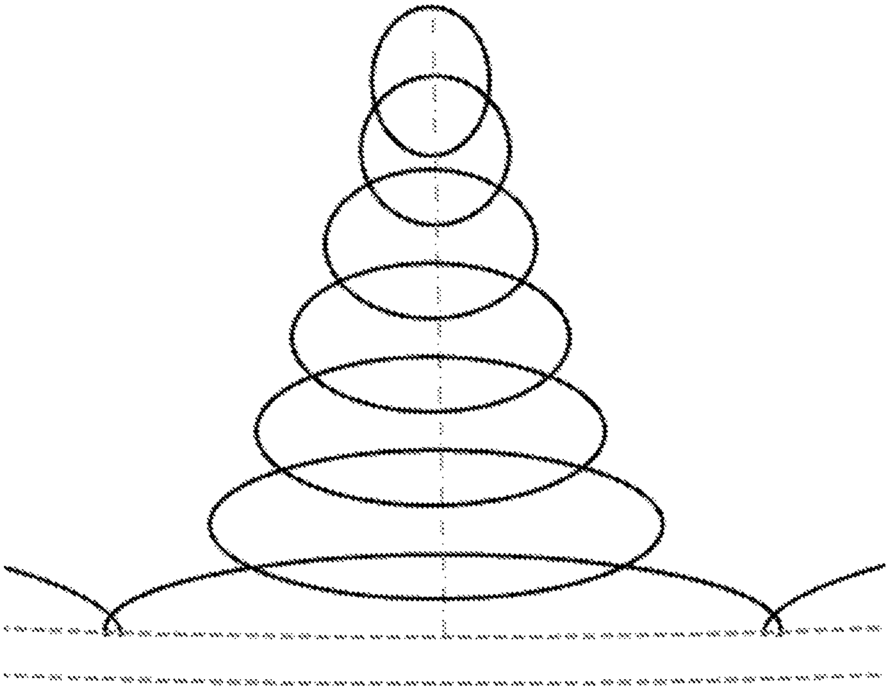

FIG. 1 (*a*) Schema 1 of the structure of apparatus for the revalorization of various organic waste;

FIG. 1 (*b*) Schema 2 of the structure of apparatus for the revalorization of various organic waste;

FIG. 2 Schema of the movement of toric rotation in the vertical direction of the mixture of organic waste and water of the method and apparatus for revalorization of various organic waste;

FIG. 3 Schema of 3D diagram of bubbler the apparatus for revalorization of various organic waste;

FIG. 4 (*a*) 3D of nozzle of the apparatus for revalorization of various organic waste (with one curved groove);

FIG. 4 (*b*) 3D of nozzle of the apparatus for revalorization of various organic waste (with two curved grooves);

FIG. 5: Schema of apparatus for the revalorization of various organic waste: the morphological changes from the creation of bubbles at the nozzle to the inner wall of the tank.

DESCRIPTION OF IMPLEMENTATION

The present invention makes public the method for revalorization of various organic waste, this method will be described in detail below, combined with examples.

Example: a method for revalorization of various organic waste, first, enter the fluid mixture of organic matter and water (hereafter referred to as "mixture") in a hermetically sealed treatment tank, in which the pressure is negative while maintaining low temperature. The bubbler produces gas bubbles that inject to the mixture and vigorously stir the mixture in the sealed treatment tank under depressure, then establish the movement of toric rotation in the vertical direction in the mixture. If there is a requirement to kill the active bacteria, the sealed treatment tank will maintain a temperature between 20 and 30 degrees Celsius. Otherwise, the low temperature remains between 10 and 40 degrees Celsius.

In this example, during the movement of toric rotation in the vertical direction of the mixture, the high-speed movement bubble carrying focused energy vigorously collide into the mixture, thus showing the Rheo-fluidizing effect (Shear thinning), decrease the viscosity of the mixture, and depolymerize long-chain molecules in organic waste.

If grease emulsion is present in the mixture, at this time de-emulsifying occurs, separating oils and fats. This happens while, because of depressure, if present, bacteria are killed. Spores and inactive bacteria remain in the small quantity of grease mixed in the organic matter. Finally, organic matter is separated into water soluble substances, higher-density than water insoluble substances and lower-density than water insoluble substances. The soluble substances will dissolve into the water, the higher-density insoluble substances will decant to the bottom of the container, and the lower-density insoluble substances will float on top of the water level. This achieves active bacteria killing, separation, concentration and de-emulsification.

In this example, the described mixture is obtained by means of mixing evenly the organic waste and water.

The present invention also makes public an apparatus for the revalorization of various organic waste, this apparatus will be described in detail below, combined with examples.

Example 1: FIG. 1(*a*) shows an apparatus for the revalorization of various organic waste, it includes a treatment tank 1, a feed inlet valve 2 du mélange, a vacuum pump 3 to achieve negative pressure in the treatment tank, a bubbler 4 and an inlet valve 5. The treatment tank is grounded by the conductive cable and contains a feed inlet and a vent valve connected to the inside of the tank. The feed inlet is connected to the feed inlet valve 2, which is installed on the entry pipe 6, in order to control opening and closing the entry pipe 6. The described entry pipe 6 conducts the entrance of the mixture of fluid organic residue with water into the treatment tank 1, the described mixture is obtained by means of mixing evenly the organic waste and water. The described vent valve is connected to the vent pipe 7, on which is installed the first vent valve 8. The described first vent valve 8 controls the opening and closing of the vent pipe 7.

A suction pipe 9 installed on the upper of the treatment tank 1 connects to the interior of the treatment tank. The mixture entering the treatment tank situates lower than the position of the suction valve. The vacuum pump 3 has an inlet and an exhaust outlet. The former is called the first inlet. This first inlet connects to the suction line through the suction pipe 9. The suction pipe 9 has installed on it an inlet valve 10, which controls the opening and closing of the suction pipe 9, causing the first inlet and the suction valve to be either connected or disconnected.

The exhaust outlet of the described vacuum pump 3 is connected to two outlet pipes. The two outlet pipes are called the first exhaust outlet pipe 11 and second outlet pipe to the bubbler 12 respectively. The second vent valve 13 is installed on the first exhaust outlet pipe 11. The vent valve 13 is used to open and close the first exhaust outlet pipe 11. The lower part of treatment tank 1 has an inlet 4*a* connected to the interior of the treatment tank. This inlet 4*a* is called the second inlet. The described second outlet pipe to the bubbler 12 is connected to the second inlet 4*a*. The described inlet valve 5 is installed on the described second outlet pipe to the bubbler 12, and it is used to open or close the described second outlet pipe to the bubbler 12, causing the second outlet pipe to the bubbler 12 and the second inlet 4*a* to be either connected or disconnected.

The treatment tank 1 has installed the first discharge outlet which is connected to its interior. At the first discharge valve 14 is installed on the first outlet, which controls the opening and closing of the first outlet. The bubbler is installed on the interior of the tank, facing the second inlet. The described hermetically sealed treatment tank 1 has negative pressure while maintaining low temperature. The bubbler 4 produces gas bubbles that inject to the mixture and vigorously stir the mixture in the sealed tank under depressure, then establish the of toric rotation in the vertical direction in the mixture.

The prepared the fluid mixture of organic matter and water inside the treatment tank 1 rise along the inner wall of the hermetically sealed treatment tank, and flow down in the center part of sealed treatment tank, re-rise again along the inner wall of the treatment tank, and the cycle continues, following the trajectory of the movement (see the FIG. 2)

During the movement of toric rotation in the vertical direction of the mixture, the high-speed movement bubble carrying focused energy vigorously collide into the mixture, thus showing the Rheo-fluidizing effect (Shear thinning), decrease the viscosity of the mixture, and depolymerize long-chain molecules in organic waste.

If grease emulsion is present in the mixture, at this time de-emulsifying occurs, separating oils and fats. This happens while, because of depressure, if present, bacteria are killed. Spores and inactive bacteria remain in the small quantity of grease mixed in the organic matter. Finally, organic matter is separated into water soluble substances, higher-density than water insoluble substances and lower-density than water insoluble substances. The soluble substances will dissolve into the water, the higher-density insoluble substances will decant to the bottom of the container, and the lower-density insoluble substances will float on top of the water level. This achieves active bacteria killing, separation, concentration and de-emulsification. The movement of toric rotation in the vertical direction of the mixture lasts 15 minutes, after then, decantation is needed for 15 minutes.

In this example, FIG. 3 shows that the bubbler 4 includes the adapted format first tube 41 on the inner wall of the treatment tank, connecting tube 42 and multiple second tubes 43. The first tube 41 is fixed to the treatment tank 1. The connecting tube 42 connects the inside of the first tube 41 with the second inlet valve, the multiple second tubes 43 are evenly distributed around a circle and installed at the bottom of the first tube 41. The multiple second tubes 43 are set up vertically on the lower side wall of the first tube 41 are connected with the inside of the first tube 41. Every second tube 43 has on its bottom part a nozzle 44 connected to the inside of the tube. Bubbles are produced within the nozzle 44 and inject out through the nozzle 44.

FIG. 4 (*a*) and FIG. 4 (*b*) show, in this example, the top part of the nozzle 44 has the perforation 45. The latter together with the second tube 43, are used to produce bubbles. The bottom part of the nozzle 44 has a curved groove 46, or two curved grooves 46 positioned in parallel, when there is one curved groove 46 the bubbles produced by the nozzle land on the groove and slide along the surface of the groove, while they get stretched horizontally into an oblong shape, eventually leaving the curved groove 46 to move towards the inner wall of the treatment tank 1. When there are two grooves 46, the two of them are interconnected, and they are symmetric bilaterally. Their connecting edge are located higher than the lowest point of the curved grooves 46. The bubbles are produced at nozzle and land on the connecting part of the curved grooves 46 and slide along the surface of the groove, forcing an ellipsoid shape on the bubbles as it happens. They end up leaving the grooves for the inner walls of the treatment tank.

In this example, the diameter of the perforation 45 is ⅛ inches.

In this example, the angle θ1 between the vertical axis and direction of injection of the nozzle is 26.5 degree.

In this example, a linear accelerator is placed between the second outlet pipe 12 to the bubbler and the second inlet. This described accelerator is implemented with a converging tube, with an angle of convergence of the tube between 69 degrees.

In this example, the vacuum inside of treatment tank 1 is 0.75-0.85 bar. In this example, the treatment tank 1 has the cylinder shape, the diameter and height of the treatment tank 1 have ratio is 2/5.

In this example, the mixture of organic waste and water entering the treatment tank 1 takes up 75% of the volume of the treatment tank.

In this example, the mixture is that of the pig manure and water, there is a requirement to kill the active bacteria, while the low temperature is 20° C.-30° C.

Towards the treatment of pig manure using the apparatus for revalorization the various organic waste, open the feed input 2 and the first vent valve 8, then the inlet valve 10, inlet valve 5 to the bubbler, the second vent valve 13 and the first discharge outlet valve 14, while the treatment tank 1 is at ambient pressure, enter the pre-prepared fluid mixture of pig manure and water into treatment tank 1, then close the feed input pipe 6 and the first vent valve 8; then open the inlet valve 10 to the vacuum pump and the second vent valve 13, start the vacuum pump 3 to partially evacuate the treatment tank 1 above the mixture and the evacuated gas exhausted through the first exhaust outlet pipe 11, until the vacuum reaches the preset depressure and hold at this preset vacuum for typically 3 minutes to remove methane following the death of active bacteria. At this time, close the second vent valve 13, open inlet valve to the bubbler 5, the evacuated gas enters the bubbler 4 by the second outlet pipe to the bubbler 12. The bubbles with negative pressure are produced in bubbler 4 and are injected into the mixture and vigorously stir the mixture in the sealed tank 1 under depressure, then establish the movement of toric rotation in the vertical direction in the mixture.

During the movement of toric rotation in the vertical direction of the mixture, the high-speed movement bubble carrying focused energy vigorously collide into the mixture of pig manure and water, thus showing the Rheo-fluidizing effect (Shear thinning), decrease the viscosity of the mixture of pig manure, and depolymerize long-chain molecules in pig manure.

Grease emulsion and bacteria are present in the mixture of pig manure. De-emulsifying occurs, separating oils and fats. This happens while, because of effect of depressure, active bacteria are killed. Spores and inactive bacteria remain in the small quantity of grease mixed in the organic matter. This achieves active bacteria killing, separation, concentration, de-emulsification.

Finally, the mixture of pig manure and water is separated into three layers, the top layer composes of greasy substances including the oils and fats (oil phase), the middle layer is of soluble substances dissolved into the water (liquid phase), the bottom layer is organic matter separated from pig manure and decanted to the bottom of container (solid phase). The separation of mixture of pig manure and water is terminated. Close the inlet valve 10 and vacuum pump 3, open the first vent valve 8, restore the ambient pressure in the treatment tank 1. After 15 minutes of decantation, using existing technology, one obtains the oil phase, liquid phase and solid phase, which can now be recycled and reused for further purposes.

Comparing the other poultry manure or plant residue, the pig manure contains a large amount of grease emulsion and water, thus most difficult to treat. Through the treatment of pig manure with the present invention of apparatus for revalorization of various organic waste, one can infer further applications of the present invention to the revalorization of various organic waste and manure such as poultry manure. The most optimal reusage of the produce is in organic fertilizing.

The present solution is totally different from the traditional fermented compost which takes over two weeks of processing. When the apparatus for the revalorization of various organic waste provided by the presentation invention treats the pig manure, it has a short processing cycle, an efficient way of revalorizing organic waste without producing unpleasant odors and non-polluting, the recovery rate the organic matter reaches up to 95% without destroying the microorganisms and nutrients while only 35%-50% for the traditional recovery, the final product could be the organic fertilizer of corresponding specifications according to the needs, in order to meet the needs of crop growth and soil for different NPK and trace elements. As most of organic matter is recovered, very few waste gas and liquid produced during the operation, it can be controlled under the local regulation of discharge, void of pollution. The technology of the present invention carries advantages comparing the traditional solutions. After being degreasing and cold-dried while consuming little energy, the organic fertilizer is stable, dry, and clean, it could be conserved for long time, transportation of it is simple, making it easily suitable for subsequence processes. Therefore, the apparatus for the revalorization of various organic waste of present invention pushes the cycle of organic matter towards an ecological path, in addition to having a wide range of potential applications.

Example 2: this example is essentially the same as example 1, the difference is: In this example, the organic waste is kitchen waste, and it is intended to produce organic fertilizer. There is no grease emulsion in the kitchen waste, but it contains oil, so oil separation is needed. The movement of toric rotation in the vertical direction of the mixture of kitchen waste and water lasts 10 minutes. After completing the movement of toric rotation in the vertical direction of mixture of kitchen waste and water, the decantation lasts 10 minutes.

In this example, the diameter of the perforation 45 is ⅛ inches.

In this example, the angle θ1 between the vertical axis and direction of injection of the nozzle θ1 is 26.5 degree.

In this example, a linear accelerator is placed between the second outlet pipe to the bubbler 12 and the second inlet. This described accelerator is implemented with a converging tube, with an angle of convergence of the tube between 69 degrees.

In this example, the vacuum inside of treatment tank 1 is 0.75-0.85 bar.

In this example, the treatment tank 1 has cylinder shape, the diameter and height of the treatment tank 1 have ratio is 2/5.

In this example, the mixture of organic waste and water entering the treatment tank 1 takes up 67% of the volume of the treatment tank.

In this example, the mixture is that of the kitchen waste and water. there is a requirement to kill the active bacteria, while the low temperature is 20° C.-30° C. Natural waste food has different shapes and sizes. According to the needs of organic fertilizer production, the mixture needs to be shredded into small particle in 5 mm before mixing with water.

Towards the treatment of kitchen waste using the apparatus for revalorization the various organic waste, first open the feed input 2 and the first vent valve 8, then close the inlet valve 10 to the vacuum pump, inlet valve 5 to the bubbler, the second vent valve 13 and the first discharge outlet valve 14. While the treatment tank 1 is at ambient pressure, enter the pre-prepared fluid mixture of pig manure and water into treatment tank 1, then close the feed input pipe 6 and the first vent valve 8; then open the inlet valve 10 to the vacuum pump and the second vent valve 13, start the vacuum pump 3 to partially evacuate the treatment tank 1 above the mixture and the evacuated gas through the first exhaust outlet pipe 11, until the vacuum reaches the preset for typically 3 minutes to remove methane following the death of active bacteria. At this time, close the second vent valve 13, open the described inlet valve 5, the evacuated gas enters the bubbler 4 by the second outlet pipe to the bubbler 12. The bubbles with negative pressure is produced inside the bubbler 4, inject into the mixture and vigorously stir the mixture in the sealed tank 1 under depressure, then establish the movement of toric rotation in the vertical direction in the mixture.

During the movement of toric rotation in the vertical direction of the mixture of kitchen waste and water, the high-speed movement bubble carrying focused energy vigorously collide into the mixture of pig manure and water, thus showing the Rheo-fluidizing effect (Shear thinning), decrease the viscosity of the mixture of kitchen waste, and depolymerize long-chain molecules in kitchen waste.

Because of effect of depressure, active bacteria are killed. Spores and inactive bacteria remain in the small quantity of grease mixed in the organic matter. This achieves active bacteria killing, separation and concentration.

Finally, the mixture of kitchen waste and water is separated into three layers, the top layer composes of greasy substance including the oil and fats (oil phase), the middle layer is of soluble substance dissolved into the water (liquid phase), the bottom decanted layer is of organic matter separated from kitchen waste (solid phase). The separation of mixture of kitchen waste and water is then terminated, close the inlet valve 10 and vacuum pump 3, open the first vent valve 8, restore the ambient pressure in the treatment tank 1. After 10 minutes of decantation, using existing technology, one obtains the oil phase, liquid phase and solid phase, which can now be recycled and reused for further purposes.

Kitchen waste is a kind of organic residue, it has always been the primary concern by the municipalities. By way of present invention, one can fully understand the usage and application of apparatus of present invention in the treatment of kitchen waste, which it can transform into organic fertilizer or biomass for energy production.

Totally different from the traditional fermented compost which takes over two weeks of processing, the apparatus for the revalorization of various organic waste provided by the present invention treats the kitchen waste, which is a short processing cycle, an efficient way of revalorizing organic waste without producing unpleasant odors and is non-polluting. There is no selection of the type of food to be treated, including seafood such as shellfish, various meats, bones and vegetable residue. no decomposition and no greenhouse gases emission during the process. The final product of organic matter is stable, dry, and clean, it could be conserved for long time and is easy to transport, making it easier for subsequent process for ulterior uses.

Example 3: this example is essentially the same as example 1, the difference is:

In this example, the organic waste is paper mill sludge, which is acidic fiber-rich organic waste.

As FIG. 1 (*b*) shows, the treatment tank 1 contains major tank 1*a* and auxiliary tank 1*b*. The major tank 1*a* and auxiliary tank 1*b* are set up in parallel way.

The upper part of major tank 1*a* and auxiliary tank 1*b* are rectangular or cubic, the lower part of the major tank 1*a* and auxiliary tank 1*b* are conical shape, the two upper parts are connected, the bottom of this connection is called lip overflow 1*c*. The vent and suction pipeline are installed on the auxiliary tank 1*b*, the feed inlet and the second inlet are setting on the major tank 1*a*, the first discharge is setting on the bottom of the major tank 1*a*. The feed inlet of mixture 6 and the second inlet to the bubbler are set up on the major tank, the first discharge valve is installed to the bottom of the major tank 1*a*, the water inlet is fixed to the major tank 1*a* is connected to the inside of it, the described water inlet is connected to water inlet pipe 1*d*, a water inlet valve 1*e* is installed on the scribed water inlet pipe 1*d*, the water inlet valve 1*e* controls the opening and closing the scribed inlet pipe 1*d*, the second discharge outlet is installed to the bottom of the auxiliary tank 1*b* and is connected to its the interior, the second outlet valve 1*f* is installed to the second outlet pipe, the second outlet valve 1*f* controls the opening and closing of the described second outlet.

The described bubbler 4 is located inside of major tank 1*a*, the mixture of the organic waste and water in major tank 1*a* is separated into water insoluble substances with lower-density than water insoluble substances which is fiber-rich organic matter-based floating matter, the soluble substance, and the insoluble substance with higher-density than water insoluble substances which is residue.

The apparatus for the revalorization of various organic also contains the brush conveyor 1*g*, the endless screw outlet for residue 1*h* and the endless screw outlet for fiber-rich organic matter 1*j*. The brush conveyor 1*g* is horizontally installed above the lip overflow 1*c* and extends from the upper part of major tank 1*a* to that of the auxiliary tank 1*b*.

The brush conveyor 1*g* is used to sweep the fiber-rich organic waste whose liquid level reaches the lip overflow 1*c*, from the major tank 1*a* to auxiliary tank 1*b*. The endless screw outlet for fiber-rich organic matter 1*j* is installed on the bottom of auxiliary tank 1*b*, facing the second outlet, it is used to output the fiber-rich organic matter from auxiliary tank 1*b* while the second output valve if opens.

The endless screw outlet for residue 1*h* is installed on the bottom of the major tank 1*a*, facing the first outlet. It is used to output the residue of the major tank while the first discharge outlet valve 14 opens. The described water inlet is used to input the water to the major tank 1*a* to raise the liquid level to lip overflow 1*c*, and the fibre-rich organic matter can be swept into the interior of the auxiliary tank 1*b* by the bush conveyor 1*g*.

In this example, the mixture of organic waste and water entering the major tank 1*a* takes up 65% of the volume of the major tank 1*a*.

In this example, the major tank 1*a* has the rectangular shape, the equivalent diameter and height of the major tank 1*a* have ratio is 2/5.

In this example, the mixture is paper mill sludge which is the acidic fiber-rich organic waste and water, there is no requirement to kill the active bacteria, the low temperature is 10° C.-40° C.

During the treatment of fiber-rich organic waste using the apparatus for revalorization the various organic waste, open the feed input valve 2 and the first vent valve 8, then close the inlet valve 10 to the vacuum pump, inlet valve 5 to the bubbler, the second vent valve 13 and the first discharge outlet valve 14, the second discharge valve if and water inlet valve 1*e*. At this time, the major tank 1*a* and auxiliary tank 1*b* are ambient pressure. Enter the pre-prepared the fluid mixture of fiber-rich organic matter and water into major tank 1*a* via the feed input 6, then close the feed input 6 and the first vent valve 8. Then first open the inlet valve 10 to the vacuum pump and the second vent valve 13, start the vacuum pump 3 to partially evacuate the major tank 1*a* above the mixture of fiber-rich organic waste and entirely evacuate the auxiliary tank 1*b*. The evacuated gas exhausts through the first exhaust outlet pipe 11, until the vacuum reaches the preset depressure and hold at this preset vacuum for typically 3 minutes to remove methane following the death of active bacteria. Close the second vent valve 13, open the inlet valve 5 to the bubbler. At this time, the evacuated gas goes through the second outlet pipe 12 to the bubbler 4. The bubbles with negative pressure are produced in the bubbler 4 inject to the mixture and vigorously stir the mixture in the major tank 1*a* under depressure, then establish the movement of toric rotation in the vertical direction for 10 minutes in the mixture.

During the movement of toric rotation in the vertical direction of the mixture of fiber-rich organic waste, the high-speed movement bubble carrying focused energy vigorously collide into the mixture of pig manure and water, thus showing the Rheo-fluidizing effect (Shear thinning), decrease the viscosity of the mixture of fiber-rich organic waste, and depolymerize long-chain molecules in fiber-rich organic waste.

Finally, the mixture of fiber-rich organic waste is separated into three layers, the fiber-rich organic matter is on the top layer, the middle layer is soluble substance dissolved into the water, the bottom layer is residue. the separation of mixture of fiber-rich organic waste and water is terminated. Close the described inlet valve 10 and vacuum pump 3, Open the water inlet valve 1*e*, enter the water to major tank 1*a* through the water inlet pipe 1*d* in order to raise the liquid level to lip overflow 1*c*, then stop the water input once the liquid is in contact with the brush conveyor 1*g*. The brush conveyor 1*g* sweeps the fiber-rich organic matter into the interior of auxiliary tank 1*b*.

In the case where there still fiber-rich organic matter remaining in the major tank 1*a* which is lower than the lip overflow 1*c*, input the water again to major tank 1*a* through the water input tube 1*d*, until all the fiber-rich organic matter is transported to the auxiliary tank 1*b*.

Afterwards, open the first vent valve 8, restore the ambient pressure in the tank 1*a* and 1*b*; open the first discharge outlet valve 14 and the second discharge outlet valve 1*f*, open the endless screw outlet for fiber-rich organic matter 1*j* and endless screw outlet for residue 1*h*. The fiber-rich organic matter is output by the endless screw outlet for fiber-rich organic matter 1*j* and the residue is output by the endless screw outlet for residue 1*h*. Then close the first discharge valve 14 and the second discharge valve 1*f*.

Fiber-rich organic waste usually refers to organic waste containing valuable cellulse, which mainly comes from paper mill residue such as paper mill sludge (including landfilled paper mill sludge). The application of fiber-rich organic matter recycling in the textile industry is also increasing. More and more widely, fiber-rich organic residue comes from textile production such as cotton, linen, bamboo; and agricultural residue such as corn, straw and other organic matter are also containing cellulose. An efficient recovery of fiber-rich organic matter and revalorization are an important pillar in the industry of reusage of fiber-rich organic matter. Moreover, it often reduces the cost of the original production (textile, paper) and pollution.

The apparatus for the revalorization of various organic waste provided by the present invention, using physics and mechanics, does not make use of any additional chemicals. The quality of the recovered organic matter is same as its entrance. The recovery rate is up to 99%. Through separation on the organic matter from the residue, separation and cleaning, the recovered organic matter acquires the second life. With under an hour in the treatment tank, the organic matter is separated and purified by means of Rheo-fluidizing effect (shear thinning) while the bubbles vigorously stir under depressure, and the wood chips, soil, stone in the mixture increase the stirring force for better cleaning. The solution of present invention helps avoiding additional pollution during the production.

In addition, the apparatus for the valorization of various organic waste provided by the present invention operates at low temperature, requires low energy consumption, has a compact layout and installation. Depending on the required volume of treatment, the equipment could be installed in the commercial building or in a factory building, it can also be installed in the open air, or in a movable loading truck. The scalability and integration are pretty flexible, with little size requirement on the area of site. If necessary, it can be transplanted on the bypass of the existing production line without affecting the actual production.

The invention claimed is:

1. An apparatus for recycling organic residues, comprising a treatment tank, an inlet valve on an inlet pipe to the treatment tank, a fluidic mixture of the organic residues with water being introduced into the treatment tank through the inlet pipe to the treatment tank, a vacuum pump configured to produce a negative pressure in the treatment tank, a bubbler and a bubble inlet pipe with a bubbler valve thereon, the bubbles being introduced within the treatment tank through the bubble inlet pipe at a first distance from a lower part of the treatment tank, a vent pipe valve being connected to a vent pipe, the vent pipe valve controlling opening and closing of the vent pipe, a suction pipe installed on an upper part of the treatment tank connecting to an interior of the treatment tank, the vent pipe valve being located at a second distance from the lower part of the treatment tank, the first distance being smaller than the second distance, wherein the bubbler comprises a primary tube attached to an inner wall of the treatment tank, a connection tube and secondary tubes; the connection tube connecting an inside of the primary tube to the bubbler valve; the secondary tubes being evenly distributed around a circle, in a low position relative to the primary tube; the secondary tubes being arranged vertically on a lower side wall of the primary tube and connected to an interior of the primary tube, each secondary tube comprising on a lower part thereof a nozzle connected to an interior of a respective secondary tube from which the bubbles are produced and injected through the mixture, the apparatus further comprising a perforation located at a position higher than the nozzle, the nozzle and the secondary tube are used to produce the bubbles; and wherein a lower part of the nozzle comprises at least one curved groove and the bubbles produced land on the curved groove and slide along the surface of the curved groove, where the bubbles extend horizontally into an oblong shape, eventually leaving the curved groove toward an inner wall of the treatment tank.

2. The apparatus of claim 1, wherein the vacuum pump includes a first inlet and an exhaust outlet, the first inlet of the vacuum pump being connected to a suction inlet through the suction pipe, the suction pipe being equipped with a suction pipe inlet valve, the suction pipe inlet valve controlling opening and closing of the suction pipe, respectively causing connection and disconnection of the first inlet of the vacuum pump and the suction inlet; the exhaust outlet being connected to two outlet pipes, the two outlet pipes comprising a first exhaust outlet pipe and a second outlet pipe to the bubbler.

3. The apparatus of claim 1, wherein the vacuum pump includes a first inlet and an exhaust outlet, the first inlet of the vacuum pump being connected to a suction inlet through the suction pipe, the suction pipe being equipped with a suction pipe inlet valve, the suction pipe inlet valve controlling opening and closing of the suction pipe, respectively causing connection and disconnection of the first inlet of the vacuum pump and the suction inlet; the exhaust outlet being connected to two outlet pipes, the two outlet pipes comprising a first exhaust outlet pipe and a second outlet pipe to the bubbler, and wherein a first exhaust outlet pipe vent valve is installed on the first exhaust outlet pipe, and configured to open and close the first exhaust outlet pipe; the lower part of the treatment tank includes a second inlet, the second outlet pipe to the bubbler being connected to the inlet valve for the bubbles;

the inlet valve for the bubbles being installed on the second outlet pipe to the bubbler and used to selectively open and close the second outlet pipe to the bubbler, selectively causing connection and disconnection of the second outlet pipe to the bubbler and the second inlet of the treatment tank.

4. The apparatus of claim 1, wherein the vacuum pump includes a first inlet and an exhaust outlet, the first inlet of the vacuum pump being connected to a suction inlet through the suction pipe, the suction pipe being equipped with a suction pipe inlet valve, the suction pipe inlet valve controlling opening and closing of the suction pipe, respectively causing connection and disconnection of the first inlet of the vacuum pump and the suction inlet; the exhaust outlet being connected to two outlet pipes, the two outlet pipes comprising a first exhaust outlet pipe and a second outlet pipe to the bubbler, and wherein a first exhaust outlet pipe vent valve is installed on the first exhaust outlet pipe, and configured to open and close the first exhaust outlet pipe; the lower part of the treatment tank includes a second inlet, the second outlet pipe to the bubbler being connected to the inlet valve for the bubbles;

the inlet valve for the bubbles; being installed on the second outlet pipe to the bubbler and used to selectively open and close the second outlet pipe to the bubbler, selectively causing connection and disconnection of the second outlet pipe to the bubbler and the second inlet of the treatment tank; and wherein the treatment tank includes a first discharge outlet; a first discharge valve is installed on the first discharge outlet and selectively controls opening and closing of the first discharge outlet; the bubbler being installed inside the treatment tank facing the second inlet of the treatment tank.

5. An apparatus for recycling organic residues, comprising a treatment tank, an inlet valve on an inlet pipe to the treatment tank, a fluidic mixture of the organic residues with water being introduced into the treatment tank through the inlet pipe to the treatment tank, a vacuum pump configured to produce a negative pressure in the treatment tank, a bubbler and a bubble inlet pipe with a bubbler valve thereon, the bubbles being introduced within the treatment tank through the bubble inlet pipe at a first distance from a lower part of the treatment tank, a vent valve being connected to a vent pipe, the vent pipe valve controlling opening and closing of the vent pipe, a suction pipe installed on an upper part of the treatment tank connecting to an interior of the treatment tank, the vent pipe valve being located at a second distance from the lower part of the treatment tank, the first distance being smaller than the second distance, wherein the bubbler comprises a primary tube attached to an inner wall of the treatment tank, a connection tube and secondary tubes; the connection tube connecting an inside of the primary tube to the bubbler valve; the secondary tubes being evenly distributed around a circle, in a low position relative to the primary tube; the secondary tubes being arranged vertically on a lower side wall of the primary tube and connected to an interior of the primary tube, each secondary tube comprising on a lower part thereof a nozzle connected to an interior of a respective secondary tube from which the bubbles are produced and injected through the mixture, the apparatus further comprising a perforation located at a position higher than the nozzle, the nozzle and the secondary tube are used to produce the bubbles; and wherein the lower part of the nozzle comprises two curved grooves positioned in parallel, the two grooves being connected one a part and bilaterally symmetrical, the two grooves having a connecting edge located higher than a lower point of the curved grooves, the bubbles produced at the nozzle landing on the part connecting the curved grooves and sliding along surfaces of the curved grooves, gradually inducing an ellipsoidal shape to the bubbles which eventually leave the grooves for internal walls of the treatment tank.

6. An apparatus for recycling organic residues, comprising a treatment tank, an inlet valve on an inlet pipe to the treatment tank, a fluidic mixture of the organic residues with water being introduced into the treatment tank through the inlet pipe to the treatment tank, a vacuum pump configured to produce a negative pressure in the treatment tank, a bubbler and a bubble inlet pipe with a bubbler valve thereon, the bubbles being introduced within the treatment tank through the bubble inlet pipe at a first distance from a lower part of the treatment tank, a vent valve being connected to a vent pipe, the vent pipe valve controlling opening and closing of the vent pipe, a suction pipe installed on an upper part of the treatment tank connecting to an interior of the treatment tank, the vent pipe valve being located at a second distance from the lower part of the treatment tank, the first distance being smaller than the second distance, wherein the bubbler comprises a primary tube attached to an inner wall of the treatment tank, a connection tube and secondary tubes; the connection tube connecting an inside of the primary tube to the bubbler valve; the secondary tubes being evenly distributed around a circle, in a low position relative to the primary tube; the secondary tubes being arranged vertically on a lower side wall of the primary tube and connected to an interior of the primary tube, each secondary tube comprising on a lower part thereof a nozzle connected to an interior of a respective secondary tube from which the bubbles are produced and injected through the mixture, the apparatus further comprising a perforation located at a position higher than the nozzle, the nozzle and the secondary tube are used to produce the bubbles, the apparatus further comprising a perforation located at a position higher than the nozzle, the nozzle and the secondary tube are used to produce the bubbles, a lower part of the nozzle comprising one of: i) at least a curved groove and ii) two curved grooves positioned in parallel; wherein a diameter of the perforation is comprised in a range between 3/32 inch and 3/16 inch.

7. The apparatus of claim 1, wherein an angle θ1 between a vertical axis and an injection direction of the nozzle is comprised in a range between 23 and 30 degrees.

8. The apparatus of claim 1, wherein the negative pressure inside the treatment tank is comprised in a range between 0.5 and 0.95 bar.

9. The apparatus of claim 1, wherein the treatment tank is one of: i) a cylinder with a diameter and a height in a ratio comprised in a range between 1/5 and 3/5, and ii) a tank with an equivalent diameter and a height in a ratio comprised in a range between 1/5 and 3/5.

10. The apparatus of claim 1, wherein an inside volume of the tank is selected so that the mixture inside the tank occupies between 50% and 75%.

* * * * *